United States Patent [19]
Redman et al.

[11] 3,790,762
[45] Feb. 5, 1974

[54] APPARATUS AND METHOD FOR COUNTING REPETITIVE PATTERNS IN STRIPS OF MOVING APERTURED MATERIAL

[75] Inventors: James C. Redman, Hadley, Pa.; Lynn E. Trent, Shawnee, Okla.

[73] Assignee: GTE Sylvania Incorporated, Seneca Falls, N.Y.

[22] Filed: Jan. 6, 1972

[21] Appl. No.: 215,853

[52] U.S. Cl. ........ 235/92 V, 235/92 R, 235/92 DN, 340/146.3 G
[51] Int. Cl. .......................................... G06m 1/272
[58] Field of Search ........... 235/92 V, 92 DN, 98 C; 340/146.3 G

[56] References Cited

UNITED STATES PATENTS

| | | | |
|---|---|---|---|
| 3,299,272 | 1/1967 | Furukawa | 235/92 V |
| 2,088,297 | 7/1937 | Koenig | 235/92 V |
| 2,617,042 | 11/1952 | Wouters | 235/92 V |
| 3,403,392 | 9/1968 | Wogatzke | 235/92 GC |
| 3,342,539 | 9/1967 | Nelson | 340/146.3 G |
| 3,197,735 | 7/1965 | Haynes | 340/146.3 G |
| 3,412,379 | 11/1968 | Stephens | 340/146.3 G |
| 3,550,119 | 12/1970 | Rabinow | 340/146.3 G |

*Primary Examiner*—Paul J. Henon
*Assistant Examiner*—Robert F. Gnuse
*Attorney, Agent, or Firm*—Norman J. O'Malley; Donald R. Castle; William H. McNeill

[57] ABSTRACT

An apparatus and method for counting repetitive patterns in strips of moving apertured material in which the material is passed between a light source and photodetector positioned respectively on an opposing pair of aligning body members, the photodetector in turn being electrically connected to a counter located externally of the body members. A representation member substantially identical to one of the patterns to be counted is also positioned between the light source and photodetector and as the strip of material passes over and mates with the representation in a predetermined manner, the flow of light to the photodetector is temporarily suspended, thereby providing the counter with a one count.

5 Claims, 4 Drawing Figures

PATENTED FEB 5 1974

3,790,762

APPARATUS AND METHOD FOR COUNTING REPETITIVE PATTERNS IN STRIPS OF MOVING APERTURED MATERIAL

BACKGROUND OF THE INVENTION

This invention relates to counting apparatus and methods and particularly to an apparatus and method for counting repetitive patterns in strips of moving apertured material. More particularly, this invention relates to an apparatus and method for counting very small repetitive patterns in relatively thin strips of moving apertured material, a typical example being uncut strips of lead frames eventually to be utilized in integrated circuit packages.

Lead frames of this type are produced in very large quantities and comprise a wide variety of assorted configurations. Being of thin material and easily subject to damage, these frames are most readily produced in strips until their production cycle, which most usually includes a plating step, is nearly completed, whereby they are individually severed. After this severing, they are each bonded in corresponding integrated circuit packages.

Consequently, an apparatus and method for counting the lead frames in these strips as well as other similar type patterns in strips of moving apertured material must satisfy certain criteria. Firstly, the apparatus and method must be applicable to counting all types of patterns. Secondly, it is essential that each pattern be individually counted. Thirdly, the strip of patterned material must not be damaged. And fourthly, because the production of these types of material most usually involves processes calling for varying speeds of the strip, the apparatus and method must be adaptable to these speeds. In the production of lead frame strips, one of these previously mentioned processes is usually plating, which produces a caustic atmosphere. Consequently, a counter used here must in some manner be repellant to this type of environment.

A previous method utilized for counting moving strips of uncut lead frames involved the use of a micro switch. The arm of the switch was aligned with the edge of the moving strip and as the end of the arm engaged an indentation corresponding to each frame, a one count was electronically relayed to an adjoining counter. Naturally, the stipulation exists in this particular arrangement than an indentation be provided with each individual frame, thereby rendering the arrangement impractical for counting smooth sided strips. In addition, the counting of very large quantities makes the previously described single counting process very difficult because of the relatively short operating life of switches of this variety.

Still another previous counting arrangement involved the utilization of a pair of opposing rollers, between which passed the thin strip. Each roller was positioned to engage a corresponding opposing surface on the strip and a counter was corrolated to one or both of the rollers to measure the distance of strip passed between. From this distance the number of frames could be determined. While this arrangement worked well in a dry environment, the presence of the previously mentioned caustic atmosphere caused slippage to occur between roller surface and the surface of the strip. In addition, the altering speed of the strip increased the probability of slippage occurring.

OBJECTS AND SUMMARY OF THE INVENTION

It is, therefore, a primary object of this invention to provide a new apparatus and method for counting repetitive patterns in strips of moving apertured material.

It is a further object of this invention to provide an apparatus and method for counting these repetitive patterns which obviates the previously described disadvantages of prior art methods.

It is a still further object of this invention to provide a counting apparatus which is relatively inexpensive to manufacture and easy to operate.

In accordance with one aspect of this invention there is provided an apparatus having first and second aligning body members through which passes the moving strip of apertured material. Positioned upon the first body member is a light source which is able to project light to a photodetector positioned on the second body member, the photodetector in turn being electronically joined to a counter. This light is projected through a representation member positioned between the light source and photodetector. As the apertured material passes over and mates with the representation member in a predetermined manner, the result is that no light is projected to the photodetector thereby changing the electrical conducting properties of the photodetector such that an intermittent signal is relayed to the counter, causing the counter to provide a one count.

In accordance with another aspect of this invention there is provided a method for counting repetitive patterns in strips of apertured material which involves passing the material over a representation member positioned between a light source and an opposing photodetector, projecting light from said light source through said representation member to said photodetector, and providing a counter electronically connected to the photodetector with a one count every time the representation member and one of the patterns in the strip mate to prohibit the flow of light to the photodetector.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figures 1, 2:
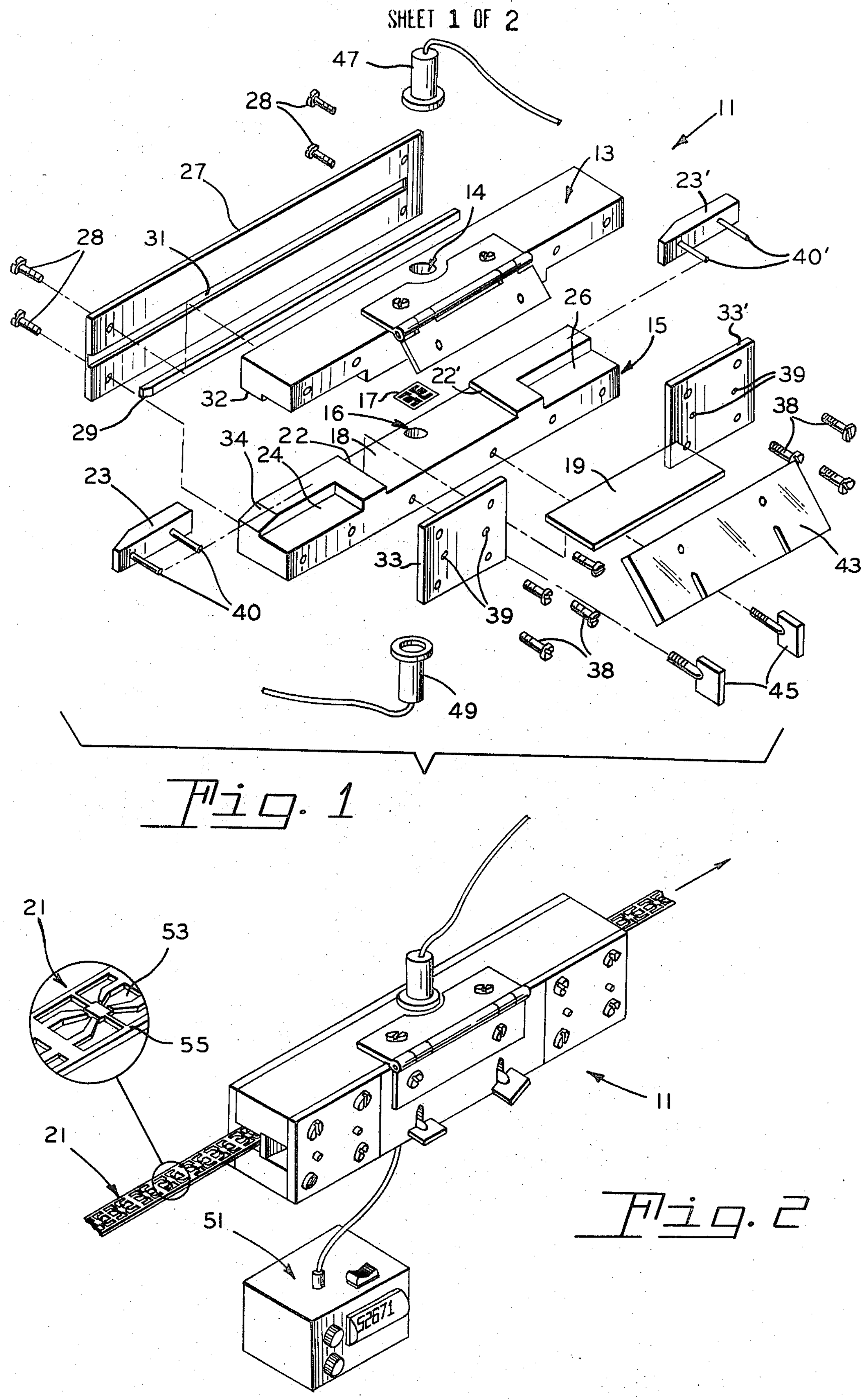
FIG. 1 is an exploded isometric view of one embodiment of the present invention.
FIG. 2 is an isometric view of the embodiment of FIG. 1 completely assembled and receiving a strip of apertured material.

Referring first to FIG. 1 there is shown an exploded view of one embodiment of the present invention, apparatus 11, which is shown to comprise, in addition to other components, a pair of aligning body members 13 and 15. First body member 13 aligns with second body member 15 in order that respective openings 14 and 16 in the members also align. These openings extend through the entire width of the respective body member and their alignment is critical to the operation of apparatus 11.

The first step in assembling apparatus 11 is to place representation member 17 on indented surface 18 of second body member 15 so that it substantially covers opening 16. In the embodiment as shown, representation member 17 is a photographically developed negative, developed utilizing standard photographic methods from a pattern substantially similar to each of the repetitive patterns in the strip of apertured material 21 (shown in FIG. 2). It is understood therefore, that representation member 17 comprises a plurality of darkened opaque areas corresponding to the respective apertured areas in each pattern in the material. Similarly, representation member 17 comprises a plurality of transparent areas corresponding to respective solid material portions in each pattern of the strip.

While it is essential that representation member 17 substantially cover opening 16, it is not necessary that the entirety of the representation do so. A totally opaque cover of opening 16 will occur when a portion of the representation aligns with a corresponding portion of each pattern on strip 21. It is necessary however that representation 17 be positioned on indented surface 18 so that this alignment can be accomplished, or in other words, the representation must be positioned so that a totally opaque covering of opening 16 will exist for the passage of each single pattern in the strip of material.

After aligning representation 17, transparent cover 19 is placed over it and fits conveniently within the opposing upstanding walls 22 and 22′ adjoining two opposing ends of indented surface 18, respectively. Cover 19 serves a dual purpose in that in addition to maintaining representation 17 in a relatively fixed position, it prevents the incursion of foreign material which could be detrimental to the functioning of apparatus 11.

Guide blocks 23 and 23′ are now placed in corresponding indentations 24 and 26, respectively, and first body member 13 is placed atop them, as well as atop cover 19. Guide blocks 23 and 23′ assist in maintaining alignment of strip 21 as it proceeds through apparatus 11. Elongated side 27 is next affixed, with screws 28 aligning with holes in both first and second body members. Just prior to final tightening of these screws, guide rail 29 is inserted into slot 31 to serve as an additional means for guiding moving strip 21. Accordingly, body members 13 and 15 are provided with angled guide-in surfaces 32 and 34 respectively to assist in inserting strip 21 into apparatus 11.

Adjacent sides 33 and 33′ are next affixed to the opposing sides of first and second body members 13 and 15, utilizing screws 38. To assure that guide blocks 23 and 23′ maintain their respective positions between body members 13 and 15, holes 39 in adjacent sides 33 and 33′ mate with respective protrusions 40 and 40′.

To provide a means whereby transparent cover 19 and representation member 17 can be removed, hinge 41 is affixed to one side to first body member 13 in the manner shown and to swinging cover 43 on the other side. Cover 43 closes to further prohibit foreign material from reaching representation member 17 during the counting process. Retaining screws 45 serve to tighten cover 43 into position, this better shown in FIG. 2.

The next step in assembling apparatus 11 is to attach light source 47 above opening 14 on first body member 13. This can be accomplished by using an epoxy or similar type glue about the periphery of opening 14. In like manner, a photodetector, illustrated as photocell 49, is attached about the external side of opening 16 on second body member 15. While a photocell is illustrated, any suitable photodetector for detecting the light transmitted through aligned openings 14 and 16, as well as through representation member 17 can be used. Another example could be a phototube.

Photocell 49 is electronically connected to counter 51 (as shown in FIG. 2) to thereby provide a visual readout to the operator of the apparatus. An enlarged view of one of the patterns found in strip 21 is illustrated and is shown to have several open areas 53 as well as solid portions 55. This pattern represents a typical example of a lead frame assembly, one of the several varieties of patterns that can be counted by apparatus 11. When strip 21 travels through apparatus 11 and passes over representation member 17, open areas 53 align with corresponding darkened areas in member 17 while solid portions 55 align with corresponding transparent areas. The overall result is a completely opaque cover of opening 16, prohibiting any light from source 47 to be transmitted to photocell 49. Accordingly, each time this opaque condition occurs, counter 51 receives an intermittent signal from photocell 49 and thereby provides a one count.

While representation member 17 is illustrated in FIGS. 1 and 2 as being a photographically developed negative, other methods for producing this member are possible. One such example would be to directly develop, in reverse, the representation pattern on the underside of transparent cover 19, thereby greatly facilitating alignment of the representation member in apparatus 11, as well as its removal. In line with this approach, representation member 17 could very easily be affixed to the underside of cover 19 utilizing epoxy or similar type glue or tape.

Figures 3, 4:
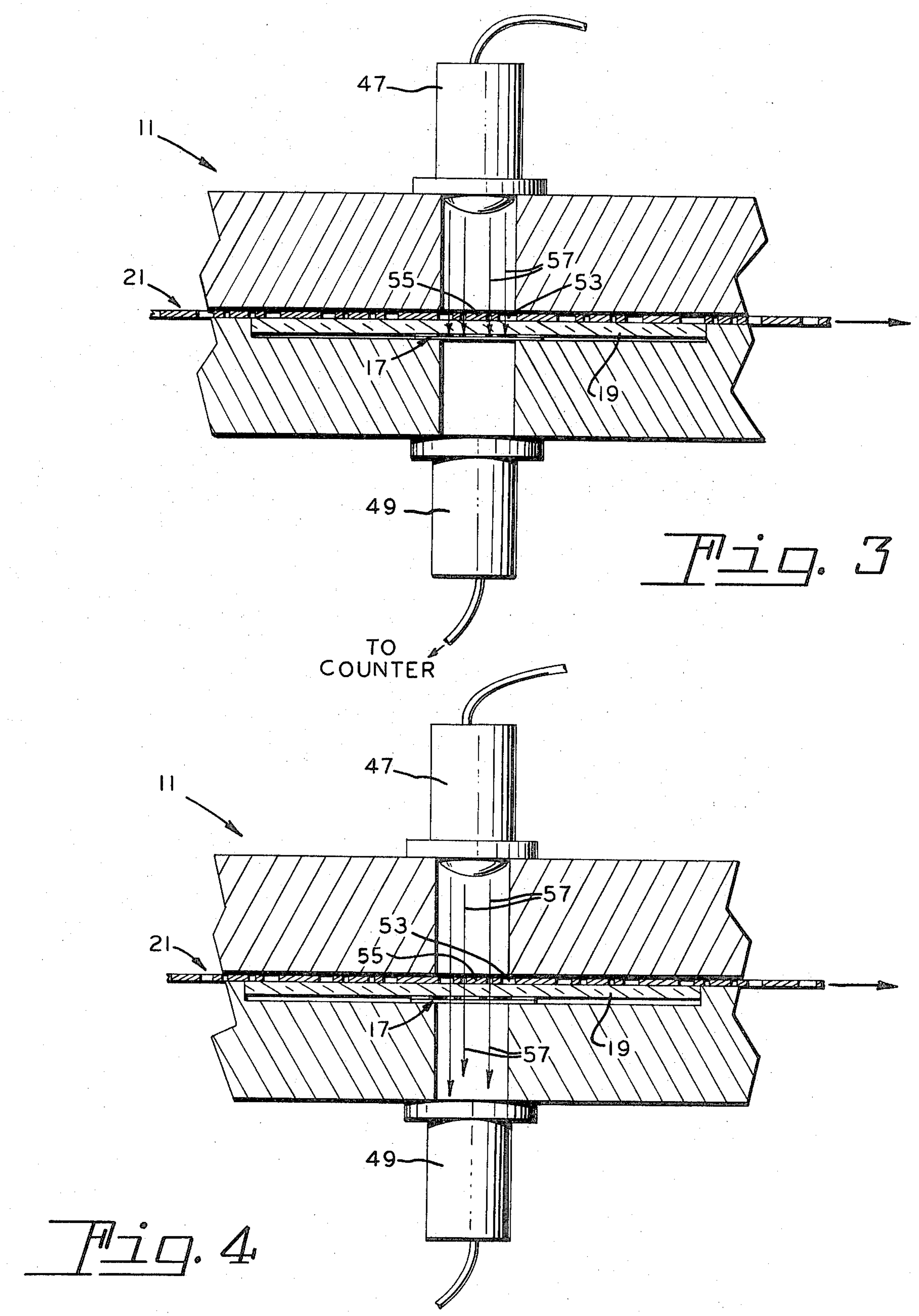
FIG. 3 is an elevational view, in section, showing the apertured material passing through the present invention and mating with the respresentation member to prohibit passage of light to the photodetector.
FIG. 4 is an elevational view similar to FIG. 3 with the exception that the material has now moved further on through the invention, causing misalignment between the representation member and material, thereby permitting the passage of light.

Referring to FIGS. 3 and 4 there are shown the two different phases of travel of strip 21 in apparatus 11, FIG. 3 showing alignment of the strip's solid portions 55 with corresponding transparent portions in representation member 17 and FIG. 4 illustrating misalignment of these areas. In FIG. 3 the previously described manner of alignment results in a complete blockage of light from light source 47 to photocell 49. Light rays 57 are transmitted through open areas 53 in strip 21 and transparent cover 19. However, they are restricted from further travel by the darkened areas in representation member 17. The effect of this darkened condition is to charge the electrical properties of photocell 49 to thereby provide a one count to the counter (not shown). In FIG. 4 this condition is reversed, with the light able to reach photocell 49 as a result of the misalignment of the previously described transparent and solid, or opaque, areas. Accordingly, it is seen that every time a pattern passes over representation member 17, a one-count is provided by the counter.

Thus there has been illustrated and described a method and apparatus for counting repetitive patterns in strips of moving apertured material in which the strip is passed over a representation member, this member positioned between a light source and a photodetector. The photodetector is electrically connected to a counter which will receive a one count whenever the representation member and strip align in a manner so as to prohibit the transmission of light from the light source to the photodetector.

While there have been shown and described what are the preferred embodiments of the invention, it will be obvious to those skilled in the art that various changes and modifications may be made therein without departing from the scope of the invention as defined by the appended claims.

What is claimed is:

1. An apparatus for counting repetitive patterns in strips of moving apertured material, said apparatus comprising:

first and second aligning body members, each of said body members having an opening formed therein;

a light source positioned on said first aligning body member and adapted for projecting light through said openings in said first and second aligning body members;

a photodetector positioned on said second aligning body member and adaptable for receiving said light from said light source and providing an intermittent signal;

a counter positioned externally from said first and second aligning body members and electrically connected to said photodetector, said counter adapted for providing a count upon receipt of said intermittent signal;

a representation member comprising a photographic negative developed from a pattern substantially similar to each of said repetitive patterns in said strip of apertured material, said representation member positioned between said light source and said photodetector over which said strip of repetitively patterned apertured material is passed, said light to said photodetector being discontinued when said representation member and one of said patterns in said material align in a predetermined manner, said photodetector thereby providing said intermittent signal to said counter.

2. The apparatus according to claim 1 in which said strip of moving apertured material comprises a plurality of individual lead frame assemblies.

3. The apparatus according to claim 1 in which a plurality of guide blocks are positioned between said first and second aligning body members to aid the travel of said moving apertured material through said apparatus.

4. The apparatus according to claim 1 in which said photodetector is a photocell.

5. The apparatus according to claim 1 in which said first and second mating body members are each provided with an angled guide-in surface to more readily facilitate positioning said apertured material to enter said apparatus.

* * * * *